No. 712,933. Patented Nov. 4, 1902.
H. JARVIS & M. H. BLAKESLEE.
TYPE WRITING MACHINE.
(Application filed May 16, 1898. Renewed Nov. 14, 1901.)

(No Model.) 7 Sheets—Sheet 1.

No. 712,933. Patented Nov. 4, 1902.
H. JARVIS & M. H. BLAKESLEE.
TYPE WRITING MACHINE.
(Application filed May 16, 1898. Renewed Nov. 14, 1901.)

(No Model.) 7 Sheets—Sheet 4.

UNITED STATES PATENT OFFICE.

HAROLD JARVIS AND MANLEY H. BLAKESLEE, OF BUFFALO, NEW YORK, ASSIGNORS, BY MESNE ASSIGNMENTS, TO JARVIS TYPE WRITER AND TABULATOR COMPANY, OF BUFFALO, NEW YORK.

TYPE-WRITING MACHINE.

SPECIFICATION forming part of Letters Patent No. 712,933, dated November 4, 1902.

Application filed May 16, 1898. Renewed November 14, 1901. Serial No. 82,249. (No model.)

*To all whom it may concern:*

Be it known that we, HAROLD JARVIS and MANLEY H. BLAKESLEE, citizens of the United States, residing at Buffalo, in the county of Erie and State of New York, have invented a new and useful Improvement in Type-Writing Machines, of which the following is a specification.

This invention relates more particularly to that class of type-writing machines in which double type are mounted on bars arranged in the form of a circular basket and in which the platen has a longitudinal and a transverse movement with reference to the printing-line, so that either of the type on a bar may be brought to the printing-line. Some parts of our improvements are also applicable to other styles of type-writing machines.

The objects of our invention are to simplify the construction of the devices whereby the platen is supported and moved transversely to the printing-line and the devices whereby the platen is rotated, to improve the construction of the guide which supports the platen-carriage, and to provide an efficient locking device whereby the key-levers are prevented from being operated when the platen has nearly reached the end of a line.

In the accompanying drawings, consisting of seven sheets.

Like letters of reference refer to like parts in the several figures.

The main frame of the machine consists, essentially, of an open base A, an open plate A', and four posts $A^2$, connecting the sides of the base and top plate.

B represents the cylindrical platen, which is movably supported above the top plate of the frame and which supports the paper on its lower side during the operation of writing on the same.

C represents one of the type-bars pivoted on the top plate below the platen and provided at its outer end with two printing types or characters $c\ c'$ and adjacent to its pivot with a crank $c^2$.

D represents one of the key-levers, which is connected with the crank of the type-bar by a rod $d$ for operating the type-bar and which is arranged lengthwise in the lower portion of the frame. The key-lever is pivoted at its rear end and provided at its front end with a button or finger-piece $d'$ and is yieldingly held in an elevated position by a spring $d^2$.

All of the foregoing parts may be of any suitable or well-known construction.

The platen, as usual, is moved forward intermittently lengthwise of the printing-line as the writing progresses and also transversely to the printing-line to permit either of the types on the type-bar to strike the paper on the platen at the printing-point. The improved mechanism whereby this movement of the platen is effected is constructed as follows:

E represents a primary or longitudinally-movable carriage, which consists, essentially, of a longitudinal rod or bar $e$ and two rearwardly-projecting cross-bars $e'$ $e^2$, connected with the ends of the longitudinal bar.

F represents the secondary or transversely-movable carriage, which consists, essentially, of two longitudinal bars $f f'$ and two cross-bars $f^2 f^3$, connecting the ends of the longitudinal bars $f f'$. The platen is arranged lengthwise in the secondary carriage, and the ends of the platen-shaft $b$ are journaled in bearings $f^4$ in the cross-bars of the secondary carriage and pass through horizontal slots $f^5$ in the cross-bars of the primary carriage, so that the secondary carriage is compelled to move lengthwise with the primary carriage, but is capable of moving transversely independent of the primary carriage. The shaft of the platen is relieved from frictional contact with the cross-bars of the primary carriage by means of rollers $g$, mounted on said shaft and running on ledges or tracks $g'$ on the outer sides of the cross-bars $e'$ $e^2$.

$g^2$ is a link which connects the front portion of one of the cross-bars of the longitudinally-movable carriage with the adjacent cross-bar of the transversely-movable carriage and whereby the platen is held against turning out of alinement during the transverse movement of the secondary carriage in the primary carriage. The platen is caused to move transversely back and forth uniformly throughout its length by a longitudinal rock-shaft H, journaled in bearings or sleeves $h$ on the rear ends of the cross-bars of the primary carriage and provided at its ends with rock-arms $h'$ $h'$, which are connected by links $h^2$ $h^2$ with opposite ends of the platen-shaft.

Figure 1:
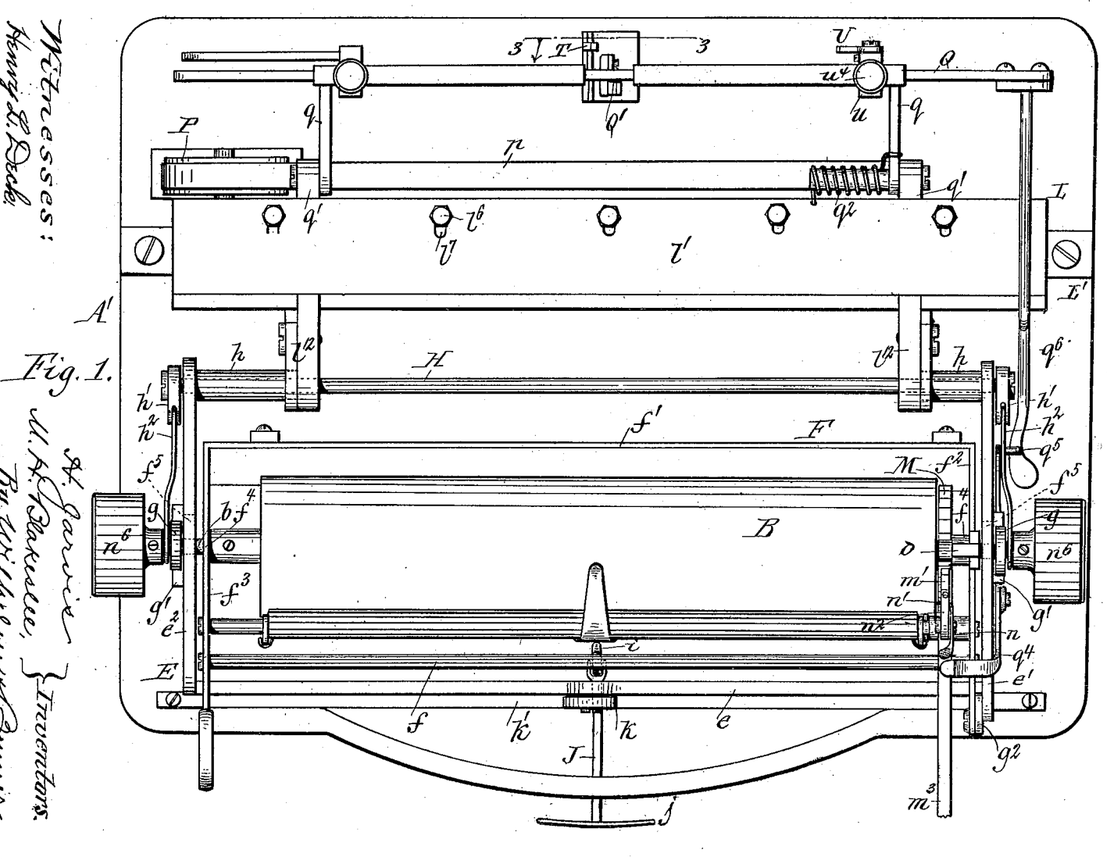
Figure 1 is a fragmentary top plan view of our improved type-writing machine.
Figures 2, 3, 4:
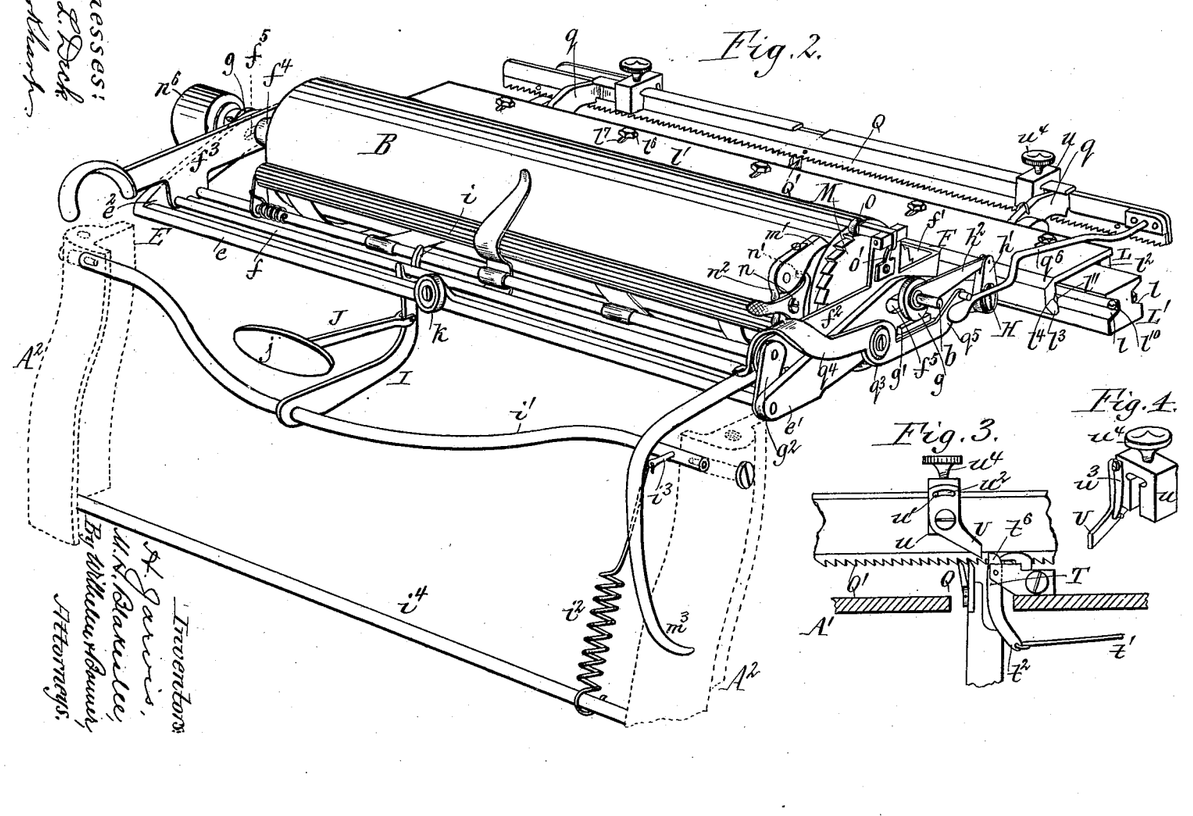
Fig. 2 is a perspective view of the platen supporting and shifting mechanism.
Fig. 3 is a fragmentary longitudinal section, on an enlarged scale, in line 3 3, Fig. 1, showing the position of parts before the key-locking mechanism is operated by the carriage.
Fig. 4 is a perspective view of the tappet whereby the key-locking mechanism is operated.
Figure 5:
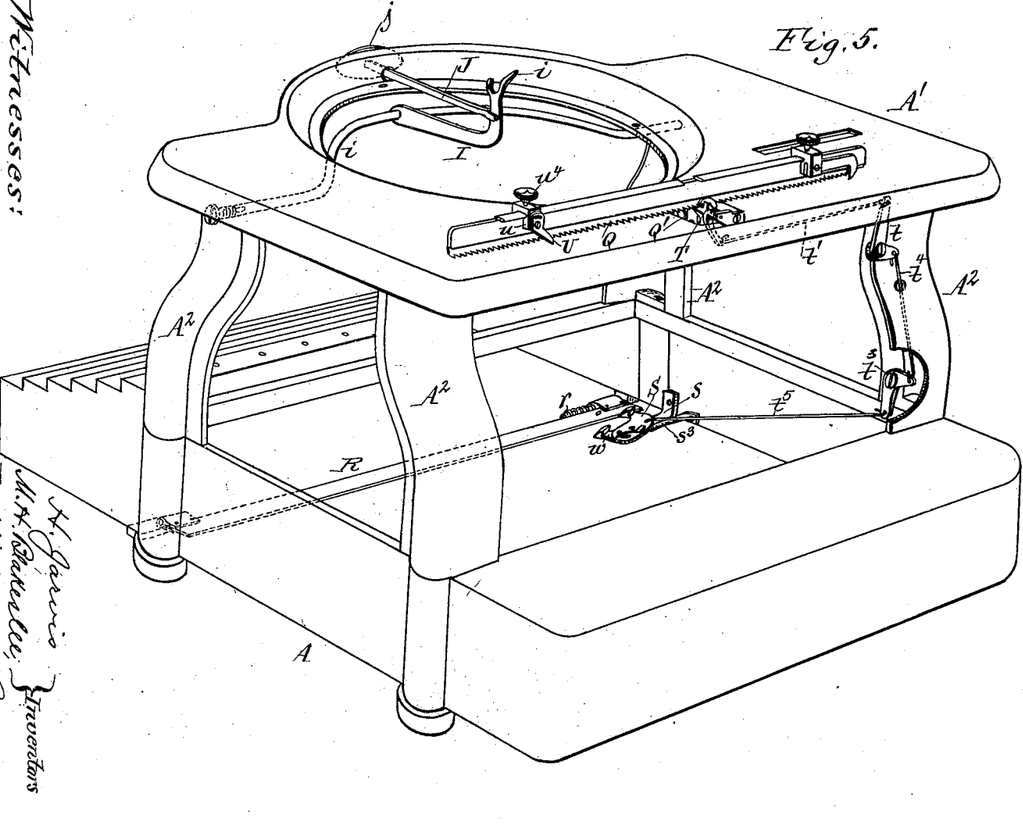
Fig. 5 is a fragmentary perspective view of the machine looking from the rear and showing the mechanism whereby the keys are locked.

I, Figs. 1, 2, and 5, represents a shifting-arm whereby the secondary carriage and the platen mounted thereon are moved transversely. This arm is provided at its upper end with an upwardly-opening fork $i$, which receives the front longitudinal bar $f$ of the secondary carriage and is secured with its lower end to a horizontal rock-shaft $i'$, which is journaled in the front posts of the frame lengthwise of the carriages.

$i^2$ is a spring which connects a forwardly-projecting arm $i^3$ on the rock-shaft $i'$ with a rod $i^4$, forming part of the main frame. This spring turns the shaft and its forked arm in the direction for moving the secondary carriage and platen forwardly and holds these parts yieldingly in the foremost position, in which position the printing-point of the platen is in line with one of the types of each type-bar.

Figures 16, 17:
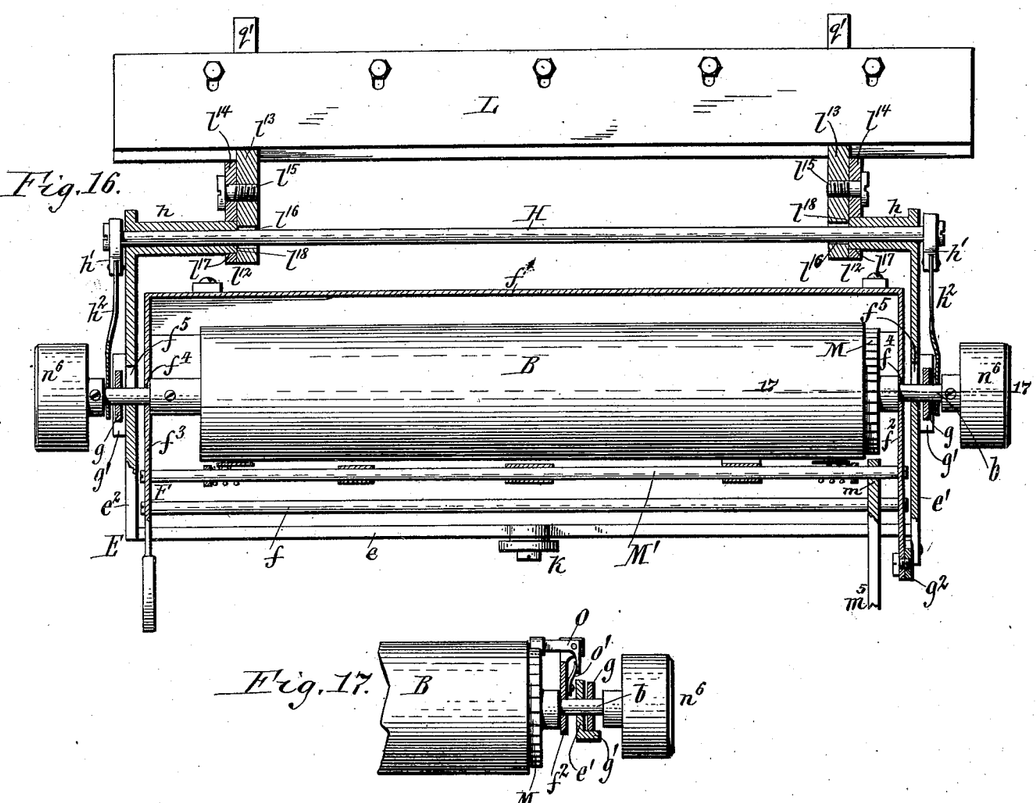
Fig. 16 is a fragmentary horizontal section of the platen-supporting carriages and connecting parts.
Fig. 17 is a fragmentary vertical section in line 17 17, Fig. 16.

J represents a horizontal shifting-rod, which is guided in the front portion of the top plate, as shown in Figs. 1 and 5, and which is pivoted at its rear end to the forked arm and provided in front of said plate with a button or finger-piece $j$. Upon pushing this shifting-rod backwardly the secondary carriage and the platen are moved rearwardly and the printing-point of the latter is carried into line with the other type of each type-bar. The transverse movement of the carriage is limited by the engagement of the platen-shaft $b$ with the ends of the slots $f^5$ in the cross-bars $e'$ $e^2$ of the primary carriage, as shown in Figs. 2 and 16. Upon lifting the carriages for inspecting the writing on the under side of the platen the front longitudinal bar of the secondary carriage is disengaged from the forked rock-arm I, and upon lowering the carriages said longitudinal bar is again engaged with the forked arm. While the carriages move lengthwise as the writing progresses, the front longitudinal bar of the secondary carriage slides lengthwise through the forked arm, so that the platen can be lifted in any position of the carriages.

The primary carriage is supported on its front side by a roller $k$, which is pivoted on the longitudinal bar $e$ on the front side of the primary carriage and which runs on a track $k'$, arranged on the top plate. The rear portion of the primary carriage is supported and guided in its longitudinal-movement by a guide arranged in rear of the carriages and consisting of a longitudinally-movable guide-case L and a supporting or guide rail L'. The latter is secured upon the top plate in rear of the carriages and lengthwise thereof and is provided with two longitudinal ball-grooves $l$ $l$ in its opposite vertical sides. The guide-case consists of a plate $l'$, arranged above the guide-rail, and two longitudinal flanges $l^2$ $l^3$, depending from the plate. These flanges are arranged on opposite sides of the guide-rail and are provided with ball-grooves $l^4$ $l^4$ on their inner sides, which face the ball-grooves of the guide-rail.

$l^5$ represents balls arranged between the grooves in the guide-rail and the grooves in the guide-flange, a pair of these balls being preferably arranged between each groove in the rail and the adjacent flange. The grooves in the rail are so constructed that the balls engage with the same near their axes, and the grooves in the flanges are so constructed that the balls engage with the balls more remote from the axis, which causes the balls as they are turned by a considerable movement of the guide-case to roll on the guide-rail only a small extent, thereby permitting of employing a comparatively short guide-rail. One of the depending flanges is made integrally with the plate of the guide-case, while the other is adjustably connected therewith by screws $l^6$, passing through slots $l^7$ in the plate, whereby any wear may be taken up. The balls on each side of the rail are held apart so as to properly support the guide-case on the rail by a separating rod or bar $l^8$, provided at opposite ends with eyes $l^9$, which loosely embrace the balls of each pair. The balls are prevented from escaping from the ball-grooves by means of stops or screws $l^{10}$ $l^{11}$, arranged on the guide-rail and flanges at the ends of the ball-grooves therein. The guide-case is provided on its front side with two forwardly-projecting ears or lugs $l^{12}$, in which the sleeves $h$ of the primary carriage turn, and thereby pivotally connect the carriage with the guide, so as to permit both carriages to be raised for inspecting the writing. Each of these lugs $l^{12}$ consists of an inner section $l^{13}$, which is fixed on the guide L, and an outer section $l^{14}$, which is attached by screws $l^{15}$ to the outer side of the inner section, as shown in Figs. 1 and 16. The sections $l^{13}$ $l^{14}$ of each lug $l^{12}$ are provided with coinciding circular openings $l^{16}$ $l^{17}$, respectively, through which the rock-shaft H passes. The opening in the outer section is larger than the opening in the inner section, thereby forming an outwardly-facing shoulder $l^{18}$ between the sections, as shown in Fig. 16. The adjacent bearing-sleeve $h$ of the primary carriage is journaled in the opening of the outer lug-section and bears with its inner end against the shoulder $l^{18}$. The opening $l^{16}$ in the inner section is larger than the diameter of the rock-shaft H, so that the latter does not engage therewith. The two bearing-sleeves $h$ by engaging with the outer sides of the inner lug-sections $l^{13}$ compel the primary carriage and guide L to move together. This means of pivotally connecting the primary carriage with the guide L and journaling the rock-shaft H permits the carriages to be freely raised and lowered without affecting the mechanism whereby the platen is shifted transversely, and it also leaves the shaft H perfectly free from any pressure or weight, thereby permitting the same to turn easily for shifting the platen transversely. This construction of a ball-bearing guide holds the platen securely in place and reduces the wear upon the guide to a minimum, thereby insuring proper alinement of the platen.

Figures 9, 10:
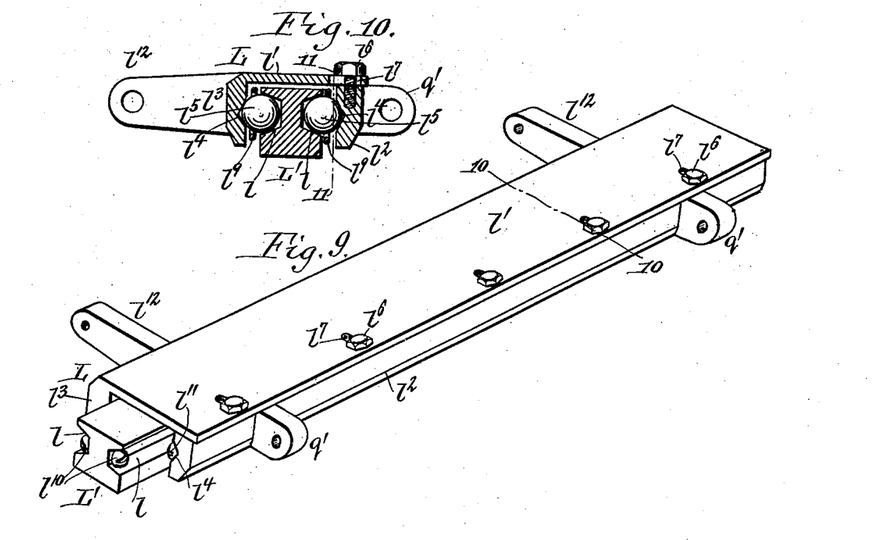
Fig. 9 is a detached perspective view of the ball-bearing guide of the platen-carriage.
Fig. 10 is a transverse section thereof in line 10 10, Fig. 9.
Figure 11:
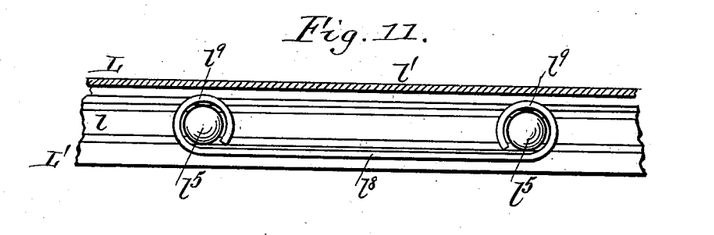
Fig. 11 is a fragmentary longitudinal section thereof in line 11 11, Fig. 10.
Figure 12:
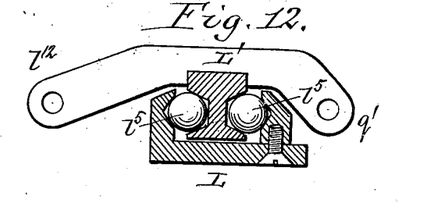
Fig. 12 is a transverse section similar to Fig. 10, showing a modified construction of the ball-bearing guide of the platen-carriage.
Figure 13:
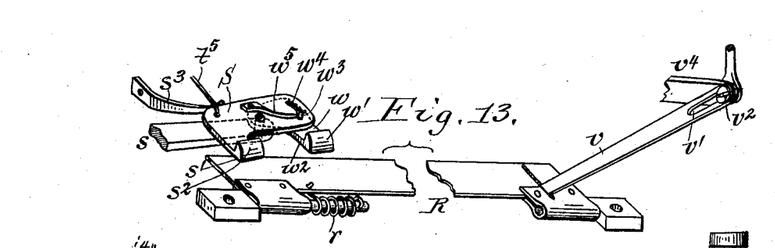
Fig. 13 is a fragmentary perspective view of the key-lever-locking mechanism.

Instead of arranging the plate which connects the guide-flanges on top of the guide-rail, as shown in Figs. 9, 10, and 11, this connecting-plate may be arranged on the lower side of the guide-rail, in which construction the case is secured to the top plate of the main frame and the guide-rail is connected with the primary carriage, as shown in Fig. 12. This means of supporting and shifting the platen and connecting parts is extremely simple and light, owing to the small number of parts, thereby permitting the machine to be operated with greater ease and speed.

Figures 6, 7, 8:
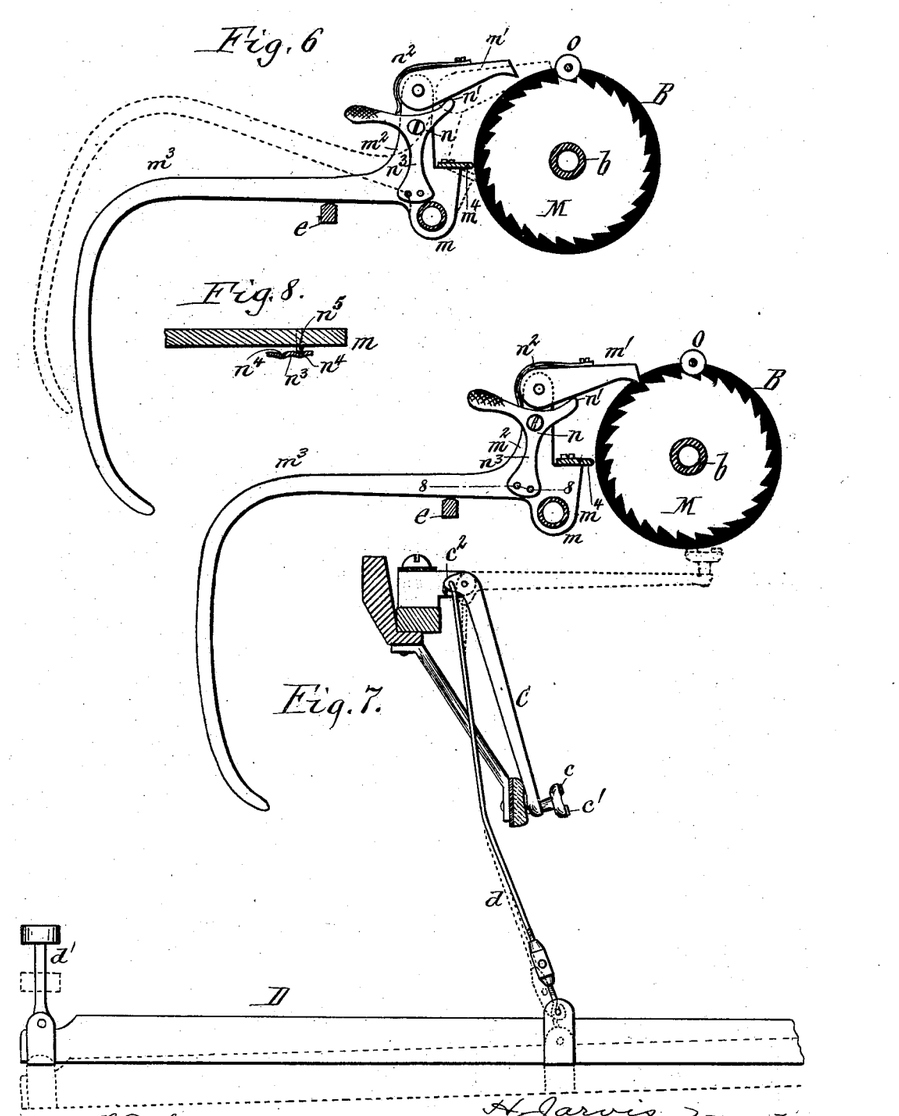
Fig. 6 is a sectional side elevation of the mechanism for turning the platen, the parts being adjusted for turning the platen one tooth or space at a time.
Fig. 7 is a similar view of the platen and its shifting mechanism and one of the type-bars and its operating mechanism, the platen-shifting mechanism being adjusted for turning the platen two spaces or teeth at a time.
Fig. 8 is a fragmentary horizontal section in line 8 8, Fig. 7.

The mechanism whereby the platen is rotated and held in its shifted position is constructed as follows:

M represents a ratchet-wheel secured to the platen or its shaft, and $m$ is a ratchet-lever provided with a pawl $m'$, which is pivoted to the upper arm $m^2$ of the ratchet-lever and which is adapted to engage with the ratchet-wheel for turning the platen. This ratchet-lever is pivoted on the secondary carriage and is normally turned backward for disengaging its pawl from the ratchet-wheel by the preponderating weight of the lower arm $m^3$ of the ratchet-lever, this backward movement of the lever being limited by the adjacent longitudinal bar $e$ of the primary carriage, with which the lower arm $m^3$ engages. The ratchet-lever $m$ may be pivoted to any suitable or convenient part of the secondary carriage, the same as shown in the drawings, Figs. 1, 6, 7, and 16, being pivoted to the paper-guide-supporting rod $M'$, which is mounted on the secondary carriage in front of the platen. Upon raising the lower arm of the ratchet-lever the pawl on its upper arm engages with the adjacent tooth of the ratchet-wheel and turns the platen until the forward movement of the ratchet-lever is arrested, which is preferably effected by a stop $m^4$, secured to the upper arm $m^2$ and engaging with the adjacent tooth of the ratchet-wheel. For the purpose of varying the turning of the platen and the space between the lines of writing the position of the ratchet-pawl is adjusted so that a greater or less amount of dead movement of the pawl is produced during the first portion of the forward stroke of the latter, thereby varying the extent of the effective or last portion of the forward movement of the pawl. The position of the pawl is controlled by an adjusting-lever $n$, which is pivoted on the upper arm of the ratchet-lever and provided on its rear arm with a finger or stop $n'$, which engages with the under side of the pawl. The pawl is yieldingly held in engagement with the stop by a spring $n^2$. Upon turning the adjusting-lever so that the stop $n'$ and the pawl resting thereon are raised considerably, as shown in Fig. 6, the pawl upon being carried forwardly by the ratchet-lever moves dead or idle a considerable portion of its forward movement before it engages with a tooth of the ratchet-wheel, this dead or idle movement being so determined that the pawl after engaging with the ratchet-tooth can only turn the platen the extent of one tooth or space during the effective or last portion of its forward movement. Upon turning the adjusting-lever so that the stop $n'$ and the pawl resting thereon are lowered, as shown in Fig. 7, the extent of the idle portion of the ratchet-lever is reduced and the pawl engages a tooth of the ratchet-wheel, which is arranged two spaces in advance of the stopping-point, so that the platen during the last portion of the forward movement of the ratchet-lever is turned the extent of two teeth or spaces. The pawl when in its retracted position rests on the stop $n'$ and is wholly disengaged from the ratchet-wheel; but in its projected position the pawl engages with the ratchet-wheel and is wholly disengaged from the stop $n'$. The adjusting-lever is preferably held in its adjusted position by a depending spring plate or lug $n^3$, formed on the adjusting-lever and provided with two notches or recesses $n^4$, as shown in Fig. 8, either of which may be engaged with a projection $n^5$ on the ratchet-lever. Upon turning the adjusting-lever when the projection engages with one of its notches the spring-plate is deflected until the next notch reaches the projection, when the plate again springs back and holds the adjusting-lever in its shifted position. As the pawl of the ratchet-lever is wholly disengaged from the ratchet-wheel when the ratchet-lever is retracted, the platen can be turned freely backward or forward by means of the thumb-pieces or buttons $n^6$ at the ends of the platen-shaft for the purpose of making corrections or interlineations in the writing.

The platen may be yieldingly held against turning by a detent device of any suitable and well-known construction. The detent device shown in Figs. 1, 6, 7, and 17 consists of an elbow-lever $o$, pivoted to an upward extension of the side bar $f^2$, so as to swing in a vertical plane. The upper arm of this lever projects horizontally inward and is provided with a roller, which is yieldingly held in engagement with the teeth of the ratchet-wheel by a spring $o'$, secured to the cross-bar $f^2$ and bearing against the lower depending arm of the elbow-lever O.

P represents the spring-drum, which is connected by a strap $p$ with the guide-case L and whereby the carriages and connecting parts are moved forward.

Q Q' represent the toothed bar and the pawls, respectively, of the escapement mechanism, whereby the intermittent forward movement of the carriages and platen is controlled and which may be of any suitable and well-known construction. The toothed escapement-bar is arranged lengthwise in rear of the ball-bearing guide and is provided with two forwardly-projecting arms $q\ q$, which are pivoted to ears $q'\ q'$ on the rear side of the ball-bearing case, so that the escapement-bar can be raised out of and lowered into engagement with the escapement-pawls. The escapement-bar is yieldingly held with its teeth in engagement with one of the escapement-pawls by a spring $q^2$.

Figure 14:
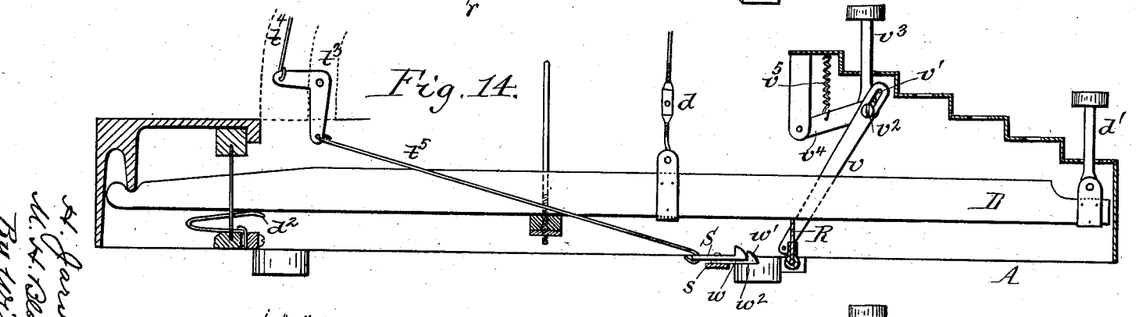
Fig. 14 is a fragmentary vertical section of the lower portion of the machine, showing the locking mechanism in its operative position and holding the key-levers against depression.
Figure 15:
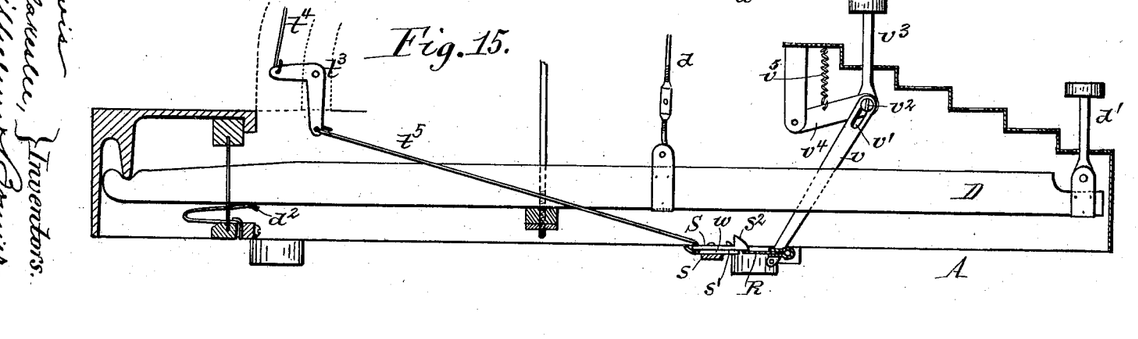
Fig. 15 is a similar view showing the locking mechanism in its inoperative position and permitting the key-levers to be depressed.

$q^3$ is a shifting-lever, whereby the escapement-bar is lifted out of engagement from the escapement-pawls at the same time that the platen is turned forward preparatory to moving the platen for beginning a new line. This shifting-lever is pivoted on one of the cross-bars of the primary carriage and is arranged with its front arm $q^4$ over the lower arm of the ratchet-lever, while its rear arm $q^5$ is arranged on an arm $q^6$, which projects from the escapement-bar in front of the pivot thereof. When the platen has nearly reached the end of a line, the key-levers are prevented from being depressed by a locking mechanism, which is constructed as follows:

R is a locking bar or plate, which is arranged transversely underneath the front portions of the key-levers and which is pivoted at its ends near one of its longitudinal edges to the base of the main frame, so that the locking-bar can swing in a vertical plane. Until the platen has nearly reached the end of the line the locking-plate stands in a horizontal position, as shown in Fig. 15, which leaves an unobstructed space below the key-levers and permits the same to be depressed for writing. When the platen has nearly reached the end of the line, the locking-bar is automatically turned into a vertical position, so that its outer or free longitudinal edge stands close to the under side of the key-levers, as shown in Fig. 14, whereby the keys are prevented from being depressed.

$r$ is a spring which constantly tends to turn the locking-plate into its raised or operative position.

S represents a main retaining-catch, whereby the locking-plate is held in its depressed or inoperative position and which is pivoted to a bracket $s$ on the base so as to swing in a horizontal plane. This catch is provided at its front end with a flat under side $s'$ and an inclined upper side $s^2$ and is yieldingly held in the path of the locking-plate by a spring $s^3$.

T represents a trip-lever, which is turned by a tappet U on the escapement-bar or some part connected with the carriage and whereby the main catch is released from the locking-plate. This trip-lever is pivoted on the rear portion of the top plate adjacent to the escapement-pawls, so as to swing in a vertical plane, and its movement is transmitted to the main catch by any suitable means, the means shown in the drawings consisting of an upper bell-crank lever $t$, pivoted on the frame and having its upper arm connected by a rod $t'$ with the lower arm $t^2$ of the trip-lever, a lower bell-crank lever $t^3$, having its upper arm connected by a rod $t^4$ with the lower arm of the upper bell-crank lever, and a rod $t^5$, connecting the lower arm of the lower bell-crank lever with the main retaining-catch. When the platen has nearly reached the end of the line, the tappet U engages with the upper arm $t^6$ of the trip-lever and turns the same in the direction for disengaging the main retaining-catch from the locking-plate, whereby the latter is released and is free to be raised by a spring $r$ into its operative position, thereby preventing the depression of the key-levers. The position of the tappet on the escapement-bar is such that the key-levers are locked before the platen has reached the extreme end of the line, thereby making it possible to write a few more letters at the end of the line in order to complete a word by withdrawing the locking mechanism. The locking-plate is depressed into its inoperative position by a shifting-rod $v$, which is pivoted at its lower end to the locking-plate eccentric to the pivot of the latter and provided in its upper end with a longitudinal slot $v'$, which receives a screw or projection $v^2$ on the lower end of a restoring button or key $v^3$. The latter is normally held in an elevated position, with its screw or projection at the upper end of the slot in the shifting-bar, by a lifting-arm $v^4$, pivotally connecting the lower end of the restoring-key with the frame, and a spring $v^5$, connecting said arm with the frame. When the locking-plate is raised into an operative position, the shifting-bar is also raised, so that the pin of the restoring-key is in the lower end of the slot $v'$ of the shifting-bar. Upon depressing the restoring-key when the parts are in this position the pin of the key $v^3$ bears against the lower end of the slot $v'$ and moves the shifting-bar downwardly, together with the locking-plate. As the locking-plate is depressed it deflects the main catch by engaging against the inclined upper side thereof, and after passing below the latter the catch is again moved forward by the spring into its normal position, so that the main catch engages with its flat under side against the top of the locking-plate and holds the same in an inoperative position. By means of the slotted connection between the restoring-key and the locking-plate the latter can be lifted without affecting the restoring-key. It may happen that the tappet does not clear the trip-lever after turning the same and withdrawing the main catch from the locking-plate, which would cause the main catch to be held in a retracted position and prevent the locking-plate from being retained in an inoperative position when depressed by the restoring-key, thereby rendering it impossible to resume writing. In order to prevent such an occurrence, an auxiliary catch $w$ is provided, which holds the locking-plate in a depressed position when the main catch is held in a retracted position by the tappet. The auxiliary catch is preferably pivoted concentric with the main catch and is arranged on the opposite side of the pivot, so that when the main catch is withdrawn from the path of the locking-plate and releases the same the auxiliary catch will be projected into the path of the locking-plate. The auxiliary catch is provided at its front end with an inclined upper side $w'$ and a flat under side $w^2$ and is capable of a limited independent movement on the main catch by means of a pin $w^3$, arranged on the auxiliary catch and passing through a segmental slot $w^4$ in the main catch. The auxiliary catch is yieldingly held in its foremost position on the main catch by a spring $w^5$, secured to the main catch and bearing against the pin of the auxiliary catch. The under side of the auxiliary catch is lower than the under side of the main catch, so that upon retracting the latter for the purpose of allowing the locking-plate to be raised into an operative position the auxiliary catch cannot pass with its flat under side over the locking-plate and prevent its rising. Ordinarily the main catch after being withdrawn for releasing the locking-plate immediately returns to its normal position into the path of the locking-plate, so that it catches the latter upon being depressed. If, however, the main catch is held in a retracted position by the tappet, the locking-plate when depressed is caught by the auxiliary catch, which at this time is projected into the path of the locking-plate. When the tappet subsequently clears the trip-lever, the main catch swings forward over the locking-plate and the auxiliary catch is retracted from above the same. The tappet is pivoted on a supporting-block $u$ and is held against turning in one direction when engaging the trip-lever by a pin $u'$, arranged on the block and engaging with one end of a slot $u^2$ in the tappet, and is yieldingly held against movement in the opposite direction to permit the tappet to ride over the trip-lever on the return movement of the platen by a spring $w^3$, secured to the block and bearing against the tappet. The supporting-block is adjustably secured by a screw $u^4$ to the escapement-bar, so as to permit of varying the point at which the locking of the key-levers is effected.

We claim as our invention—

1. The combination with the primary carriage having a longitudinal movement and provided in its cross-bars with horizontal guideways, and the secondary carriage capable of longitudinal and transverse movement and provided in its cross-bars with bearings which are in line with said guideways, of a platen provided with a shaft journaled in said bearings and movable transversely along said horizontal guideways, a vertically-swinging link connecting the primary carriage and the secondary carriage, and a shifting device whereby the secondary carriage and the platen are moved transversely in the primary carriage, substantially as set forth.

2. The combination with the primary carriage having a longitudinal movement and provided on its cross-bars with transverse guideways, and the secondary carriage having a transverse and a longitudinal movement and provided on its cross-bars with bearings, of a platen provided with a shaft which is journaled in said bearings and which moves along said guideways, a vertically-swinging link connecting said carriages, and a rock-shaft journaled in the primary carriage and provided with arms which are connected by links with the shaft of the platen, substantially as set forth.

3. The combination with the main frame and the longitudinally-movable guide mounted on the rear portion of the frame, of a primary carriage pivoted to said guide so as to move longitudinally therewith and capable of swinging vertically independent thereof, a secondary carriage capable of longitudinal and transverse movement and provided on its cross-bars with bearings, a platen provided with a shaft which is journaled in said bearings and which passes through transverse slots in the cross-bars of the primary carriage, rollers arranged on the platen-shaft and running on transverse tracks arranged on the cross-bars of the primary carriage, a rock-shaft extending concentrically through the pivot connecting the primary carriage and the guide, rock-arms arranged on the rock-shaft, and links connecting said rock-arms with the platen-shaft, substantially as set forth.

4. The combination with the main frame and the type-bars each of which is provided with two letters, of a platen-carriage capable of a longitudinal and a transverse movement and also of an upward and a downward movement, a rock-shaft journaled in the upper part of the main frame, a rock-arm mounted on the rock-shaft and provided with an upwardly-opening fork, a horizontal shifting-rod guided in the upper part of said frame and directly connected at its rear end with said arm and provided at its front end with a shifting key or button, and a shifting-bar arranged lengthwise on the carriage and adapted to be engaged with and disengaged from said fork upon moving the carriage down and up, substantially as set forth.

5. The combination with the rotary platen provided with a ratchet-wheel, of a ratchet-lever provided with a fixed stop which engages with the ratchet-wheel to limit the forward movement of said lever, a pawl pivoted on said lever and adapted to engage with the teeth on the ratchet-wheel for feeding the platen upon turning the lever, and an adjustable stop which is mounted on said lever and whereby the pawl is caused to engage with the ratchet-wheel during a shorter or a longer portion of the throw of the lever, said adjustable stop being engaged by the pawl while the latter is in its retracted position and disengaged from the ratchet-wheel but disengaged from the pawl while the latter is in its projected position and in engagement with the ratchet-wheel, substantially as set forth.

6. In a type-writing machine, the combination with the rotary platen provided with a ratchet-wheel, of a ratchet-lever provided with a pawl adapted to engage with the teeth of the ratchet-wheel for turning the platen, an adjusting-lever pivoted on the ratchet-lever and provided with a stop which engages with said pawl, a projection arranged on the ratchet-lever, and a spring-plate arranged on the adjusting-lever and provided with a number of notches which are adapted to receive said projection for holding the adjusting-lever in postion, substantially as set forth.

7. The combination with the main frame, the platen-carriage, and the vertically-movable key-levers, of a locking-plate pivoted transversely to the main frame below the key-levers, a spring whereby the locking-plate, when free, is turned up into engagement with the under side of the key-levers to prevent the depression thereof, a horizontally-movable catch mounted on the main frame and adapted to engage with the locking-plate for holding the same in a lowered or inoperative position, a vertically-swinging trip-lever pivoted on the frame and connected with the catch, and a tappet arranged on the carriage and adapted to engage with the trip-lever for turning the same and disengaging the catch from the locking-plate, substantially as set forth.

8. In a type-writing machine, the combination with the main frame, the platen-carriage and the key-levers, of a locking-plate arranged transversely below the key-levers and pivoted to the main frame, a spring whereby the locking-plate is raised into engagement with the under side of the key-levers, a main catch and an auxiliary catch arranged to engage alternately with the locking-plate and hold the same in a depressed position and intermediate connecting mechanism whereby the catches are controlled by the platen-carriage, substantially as set forth.

9. In a type-writing machine, the combination with the main frame, the platen-carriage and the key-levers, of a locking-plate arranged transversely below the key-levers and pivoted to the main frame, a spring whereby the locking-plate is raised into engagement with the under side of the key-levers, a main catch and an auxiliary catch pivoted concentrically and arranged on opposite sides of the pivot so that the catches can be engaged alternately with the locking-plate, a spring yieldingly connecting the catches so that one catch can turn independently of the other catch, and intermediate connecting mechanism whereby the catches are controlled by the platen-carriage, substantially as set forth.

10. In a type-writing machine, the combination with the main frame, the platen-carriage and the key-levers, of a locking-plate arranged transversely below the key-levers and pivoted to the main frame, a spring whereby the locking-plate is raised into engagement with the under side of the key-levers, a restoring-key whereby the locking-plate is depressed, a catch whereby the locking-plate is held in a depressed position, and intermediate mechanism whereby the platen-carriage disengages the catch from the locking-plate, substantially as set forth.

11. In a type-writing machine the combination with the main frame, the platen-carriage and the key-levers, of a locking-plate arranged transversely below the key-levers and pivoted to the main frame, a spring whereby the locking-plate is raised into engagement with the under side of the key-levers, a shifting-bar pivoted at one end to the locking-plate, a restoring-key provided with a projection engaging with a slot in the other end of the shifting-bar, a lifting-link connected with the restoring-key, a spring whereby the restoring-key and lifting-link are raised, a catch whereby the locking-plate is held in a depressed position, and intermediate mechanism whereby the movement of the platen-carriage disengages the catch from the locking-plate, substantially as set forth.

Witness our hands this 26th day of April, 1898.

HAROLD JARVIS.
  MANLEY H. BLAKESLEE.

Witnesses:
 CARL F. GEYER,
 THEO. L. POPP.